(12) United States Patent
Konetski et al.

(10) Patent No.: US 8,949,925 B2
(45) Date of Patent: Feb. 3, 2015

(54) SYSTEM AND METHOD FOR ROAMING PROTECTED CONTENT BACKUP AND DISTRIBUTION

(75) Inventors: David Konetski, Austin, TX (US); Shree Dandekar, Round Rock, TX (US); Bogdan Odulinski, Austin, TX (US); Jeffrey V. Ford, Cary, NC (US)

(73) Assignee: Dell Products, LP, Round Rock, TX (US)

( * ) Notice: Subject to any disclaimer, the term of this patent is extended or adjusted under 35 U.S.C. 154(b) by 1565 days.

(21) Appl. No.: 12/184,373

(22) Filed: Aug. 1, 2008

(65) Prior Publication Data
US 2010/0031310 A1 Feb. 4, 2010

(51) Int. Cl.
G06F 17/00 (2006.01)
G06F 7/04 (2006.01)
H04L 29/06 (2006.01)
G06F 21/10 (2013.01)

(52) U.S. Cl.
CPC ............. *H04L 63/10* (2013.01); *G06F 21/10* (2013.01); *G06F 2221/0782* (2013.01); *H04L 2463/101* (2013.01)
USPC .................................................. 726/1; 726/10

(58) Field of Classification Search
CPC ................ G06F 21/10; H04L 63/10
USPC ............................................................ 726/1
See application file for complete search history.

(56) References Cited

U.S. PATENT DOCUMENTS

| | | | |
|---|---|---|---|
| 4,780,821 A | 10/1988 | Crossley | |
| 4,827,508 A | 5/1989 | Shear | |
| 4,924,378 A | 5/1990 | Hershey et al. | |
| 6,915,425 B2 | 7/2005 | Xu et al. | |
| 7,010,808 B1 | 3/2006 | Leung et al. | |
| 7,676,436 B2 * | 3/2010 | Harper | 705/51 |
| 7,680,804 B2 * | 3/2010 | Upendran et al. | 707/999.1 |
| 8,090,662 B2 * | 1/2012 | Pence et al. | 705/59 |
| 8,145,571 B2 * | 3/2012 | Jothipragasam et al. | 705/59 |
| 2003/0066884 A1 * | 4/2003 | Reddy et al. | 235/382.5 |
| 2003/0131252 A1 * | 7/2003 | Barton | 713/193 |

(Continued)

FOREIGN PATENT DOCUMENTS

EP 1821493 A2 8/2007

OTHER PUBLICATIONS

U.S. Appl. No. 11/668,466, filed Jan. 29, 2007.

(Continued)

*Primary Examiner* — Lisa Lewis
*Assistant Examiner* — Olanrewaju Bucknor
(74) *Attorney, Agent, or Firm* — Larson Newman, LLP (57) ABSTRACT

A method includes receiving content and a license to the content at a storage system, receiving a request from a user system for the storage system to send the content and license to the user system, and sending the content and license from the storage system to the user system. Another method includes requesting content and a license to the content, receiving the content and license at a user system, requesting from the user system that the content and license be sent to a storage system, and requesting from the user system that the storage system send the content item to a second user system. In one embodiment, code could be used to perform a method that includes requesting content and a license to the content from a content provider, storing the content and license at a user system and a storage system, and requesting that the storage system send the content to another user system.

20 Claims, 5 Drawing Sheets

(56) References Cited

U.S. PATENT DOCUMENTS

| | | | |
|---|---|---|---|
| 2004/0139027 A1* | 7/2004 | Molaro | 705/59 |
| 2004/0168184 A1* | 8/2004 | Steenkamp et al. | 725/31 |
| 2005/0111327 A1 | 5/2005 | Erickson et al. | |
| 2005/0228752 A1 | 10/2005 | Konetski et al. | |
| 2006/0036554 A1 | 2/2006 | Schrock et al. | |
| 2006/0107046 A1* | 5/2006 | Raley et al. | 713/168 |
| 2006/0159109 A1* | 7/2006 | Lamkin et al. | 370/401 |
| 2006/0190410 A1* | 8/2006 | Harper | 705/59 |
| 2006/0259982 A1* | 11/2006 | Upendran | 726/27 |
| 2007/0192616 A1 | 8/2007 | Lee et al. | |
| 2007/0192837 A1 | 8/2007 | Lee et al. | |
| 2007/0219919 A1 | 9/2007 | Dandekar et al. | |
| 2007/0253552 A1 | 11/2007 | Garcia et al. | |
| 2008/0046550 A1* | 2/2008 | Mazur et al. | 709/223 |
| 2008/0103977 A1 | 5/2008 | Khosravy et al. | |
| 2008/0148101 A1 | 6/2008 | Thornley et al. | |
| 2008/0148362 A1* | 6/2008 | Gilder et al. | 726/4 |
| 2008/0162666 A1* | 7/2008 | Ebihara et al. | 709/217 |

OTHER PUBLICATIONS

"Aladdin Launches HASP Developer Solutions Directory" Aladdin Knowledge Systems, Ltd., Jun. 13, 2006, p. 1-4.

Zhu, Bin B. et al., "Content and License Roaming for eHome DRM Applications", Microsoft Research Asia, Jan. 25, 2005, pp. 1-20.

* cited by examiner

SYSTEM AND METHOD FOR ROAMING PROTECTED CONTENT BACKUP AND DISTRIBUTION

FIELD OF THE DISCLOSURE

This disclosure relates generally to a media system, and relates more particularly to displaying protected content on a media system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

A user of a media system can obtain protected content from various sources and use the protected content on the media system. The user often desires to use the protected content on another media system, or obtain copies of the protected content in the event that the original protected content is lost, corrupted, inaccessible (e.g., as result of a failed storage device), or the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a personal data assistant (PDA), a consumer electronic device such as a portable music player, a portable DVD player, or a digital video recorder (DVR), a network server or storage device, a switch router, a wireless router, or another network communication device, or any other suitable device, and can vary in size, shape, performance, functionality, and price. An information handling system can also include a set of any of the foregoing devices.

The information handling system can include memory (volatile (e.g. random access memory (RAM), etc.), nonvolatile (read only memory (ROM), flash memory, etc.), or any combination thereof), one or more processing resources, such as a central processing unit (CPU), hardware, firmware, or software control logic, or any combination thereof. Additional resources of the information handling system can include one or more storage devices, one or more communications ports for communicating with external devices, as well as various input and output (I/O) devices, such as a keyboard, a mouse, a video display, or any combination thereof. The information handling system can also include one or more buses operable to transmit communications between the various hardware resources. Portions of an information handling system may themselves be considered information handling systems.

Portions of an information handling system, when referred to as a "device", a "module", or the like, may be configured as hardware, firmware, software, or any combination thereof. For example, a device or a module may be hardware. A non-limiting example of a device or a module implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-express card, a Personal Computer Memory Card International Association (PCMCIA) card, or other such expansion card), or a system (e.g., a motherboard, a system-on-a-chip (SoC), or a stand-alone device). Similarly, the device or module can be firmware (i.e., any software running on an embedded device, a Pentium class or PowerPC™ brand processor, or other such device) or software (i.e., any software capable of operating in the relevant environment). The device or module can also be a combination of any of the foregoing examples of hardware, firmware, or software. Note that an information handling system can include an integrated circuit or a board-level product having portions thereof that can also be any combination of hardware or software.

Devices or programs that are in communication with one another need not be in continuous communication with each other, unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. A network element may be a node, a piece of hardware, software, firmware, middleware, another component of a computing system, or any combination thereof. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and, involve two or more network elements. For example, a communicative interaction may be "a conversation," or series of related communications between a client and a server—each network element sending and receiving information to and from the other. Whatever form the communicative interaction takes, the network elements involved need not take any specific form.

A communicative interaction can include management information and content information. As used herein, the term "management information" with respect to a communicative interaction, is intended to mean information used to direct, manage, or other wise control a network. As such, management information can be used by the network elements to identify the particular network elements that are coupled to the network, set-up and initialize the network elements, control routing of communicative interactions, perform another suitable function, or any combination thereof. A non-limiting example of management information includes a router set-up command, data packet header information (e.g., addresses), an Internet Control Message Protocol (ICMP) message (e.g., echo request, router discovery, timestamp, etc.), other suitable management information, or any combination thereof.

The term "content information" with respect to a communicative interaction, is intended to mean information that is not management information. Thus, content information can include information that is targeted to one or more network element, is received by the targeted elements to be processed or manipulated, displayed, stored, forwarded to another network element, perform another suitable function, or any combination thereof. A non-limiting example of content information includes most data packet payload information, a media file (e.g., audio, video, or picture files, etc.), a textual file (e.g., e-mail, word processing files, etc.), a program, a data file (e.g., spreadsheet or database file, etc.), another suitable form of content information, or any combination thereof.

Two or more information handling systems can be coupled together in a network such that individual information handling systems in the network, referred to as nodes of the network, can exchange information with each other. A non-limiting example of a network includes a local area network (LAN), a metropolitan area network (MAN), a storage area network (SAN), a wide area network (WAN), a wireless local area network (WLAN), a virtual private network (VPN), an intranet, the Internet, any other appropriate network architecture or system, or any combination thereof. The nodes on a network can include storage devices, file servers, print servers, personal computers, laptop computers, personal data assistants, media content players, other devices capable of being coupled to a network, or any combination thereof.

In the description below, a flow-charted technique may be described in a series of sequential actions. The sequence of the actions, and the party performing the steps may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes, " "including," "has," "having" or any other variation thereof, are intended to cover a non-exclusive inclusion. For example, a process, method, article, or apparatus that comprises a list of features is not necessarily limited only to those features, but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

A media system can be used to display protected content. A media system can include an information handling system, a subset of the components of an information handling system, or none of the components of an information handling system. A non-limiting example of a media system includes a personal computer, a laptop computer, a television set-top box, a music player, a compact disk (CD) or digital video disk (DVD) player, a photo display device, another suitable media system, or any combination thereof. Protected content is typically purchased by or otherwise licensed to a user of the media system. Content protection is employed to ensure that only a purchaser or licensed user can display the content. The purchaser or licensee of protected content will hereinafter be referred to as a user of protected content. Content protection typically employs the delivery of the content item and a separate license, such as an electronic key that permits the display of the content by the user on the media system. A non-limiting example of content protection includes Digital Rights Management (DRM), High-bandwidth digital Content Protection (HDCP), Content Scrambling System (CSS), another content protection system, or any combination thereof. Protected content can include software, programs, data, picture files, audio files, video files, or any other type of content that a content owner wishes to protect. As such, as used hereinafter, the display of protected content includes running protected software and programs, using and visually rendering protected data, visually rendering protected picture files, playback of protected audio files, playback and visually rendering protected video files, another use of protected content by a media system, or any combination thereof.

Content providers typically manage content servers that are coupled to a network, so that prospective users can gain access to the protected content. When a prospective user desires to obtain a particular content item, the user typically interact with the content server, such as via a web interface, to purchase or license the content item. The user then downloads the content item and the license from the content provider to the user's media system. A user can download hundreds, or even thousands of content items from a content provider. For example, a typical user's music library may include thousands of content items (e.g., individual songs) that were downloaded from different content providers (e.g., individual band web sites).

A user may desire to display the protected content on more than one media system, or make a back-up copy in case of data loss on a media system. However, recreating or duplicating a large library of protected content can be difficult when the user tries to just transfer protected content from one media system to another media system, or to a back-up storage device. One reason for the difficulty is that licenses in electronic form are typically required in order to correctly display the protected content, and the licenses are not always found in the same location (e.g., directory, registry location, etc.) as the content items. Thus, simply copying the content items from one media system to another media system, or to the back-up storage device, may not permit the protected content to be displayed on the other media system, or on the first media system when the content items are copied back from the back-up storage device. As such, transferring protected content can require that the user understands the content protection scheme. Further, different protection schemes can require different treatment to correctly transfer protected content.

If the user tries to re-obtain the protected content from the original content providers, the user first has to determine which protected content was obtained from which content provider. Next, the user needs to re-download the desired protected content to the second media system, or the back-up storage device. Where a content provider retains a list of content items downloaded by the user (e.g., the user has a standing account with that content provider), the user may be able to download all of the protected content in one transaction. However, when a content provider does not retain a list of downloaded items, the user will have to individually download each content item of the desired protected content. Further, content providers sometimes treat each download as a separate cost transaction, or limit the number of copies that can be downloaded, so the creation of duplicate or back-up libraries can be costly. The time, energy and cost of duplicating a library are multiplied as the user tries to duplicate the user's library to still further media systems.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

Figure 1:
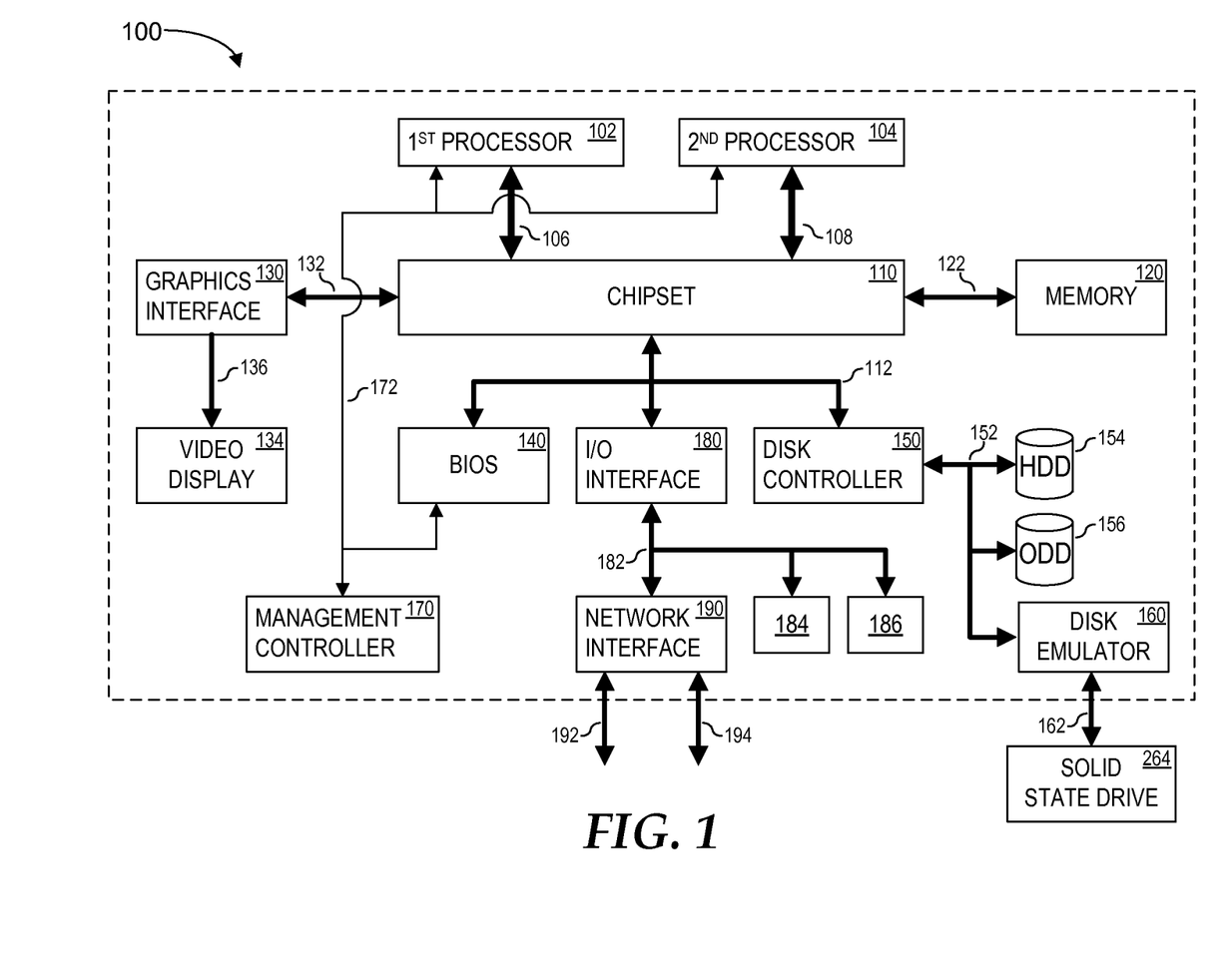
FIG. 1 illustrates a functional block diagram of an exemplary embodiment of an information handling system.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106 and the $n^{th}$ processor 104 can be coupled to the chipset 110 via the host bus 108. The chipset 110 can support the processors 102 through 104, allowing for simultaneous processing by the processors 102 through 104, and can support the exchange of information within the information handling system 100 during multiple processing operations. In an aspect, the chipset 110 can function to provide access to the processor 102 using host bus 106, and the $n^{th}$ processor 104 using the host bus 108. In another aspect, the chipset 110 can include a dedicated bus (not illustrated) to transfer data between the processor 102 and the $n^{th}$ processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus (not illustrated). The chipset 110 can also provide bus control and can handle transfers between the host buses 106 through 108, and the memory bus 122. In accordance with another aspect (not illustrated), the information handling system can include a separate memory dedicated to each processor 102 through 104. Each memory can include a memory bus coupled between each processor 102 through 104 and its dedicated memory. In accordance with yet another aspect, the chipset 110 can be generally considered an application specific chipset that provides connectivity to various buses, and integrates other system functions. For example, the chipset 110 can be provided using a chipset that includes two parts: a Graphics and Memory Controller Hub (GMCH) and an I/O Controller Hub (ICH). The chipset 110 can also be packaged as an ASIC.

The information handling system 100 can also include a graphics interface 130 that can be coupled to the chipset 110 using the graphics bus 132. The graphics interface 130 can provide a video display output 136 to the video display 134. In one form, the graphics interface 130 can be an Accelerated Graphics Port (AGP) interface to display content within a video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O channel 112 connected to the chipset 110. The I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. In one embodiment, a PCI bus can be operated at approximately 66 MHz, a PCI-X bus can be operated at approximately 133 MHz, and a PCIe link can be operated at approximately 250 million bytes per second (MB/s) per lane in each direction. PCI buses, PCI-X buses, and PCIe links can be provided to comply with industry standards for connecting and communicating between various PCI, PCI-X and PCIe enabled hardware devices, respectively. The chipset 110 can include other buses in association with, or independent of, the I/O channel 112, including other industry standard buses (e.g., Industry Standard Architecture (ISA), Small Computer Serial Interface (SCSI), Inter-Integrated Circuit ($I^2C$), System Packet Interface (SPI), or Universal Serial Bus (USB), proprietary buses or any combination thereof.

In an alternate embodiment, the chipset 110 can be a chipset employing a Northbridge/Southbridge chipset configuration (not illustrated). For example, a Northbridge portion of the chipset 110 can communicate with the processors 102 through 104 using the host buses 106 through 108, and can control interaction with the memory 120, the I/O channel 112, and activities for the video graphics interface 130. The chipset 110 can also include a Southbridge portion (not illustrated) of the chipset 110, and can handle I/O functions of the chipset 110. The Southbridge portion can manage basic forms of I/O, such as USB, serial I/O, audio outputs, Integrated Drive Electronics (IDE), ISA I/O, or any combination thereof for the information handling system 100.

The information handling system 100 can also include a basic input/output system (BIOS) module 140 that can be coupled to the I/O channel 112. The BIOS module 140 can include BIOS code operable to detect and identify resources within the information handling system 100, provide the appropriate drivers for those resources, initialize those resources, and access those resources.

The information handling system 100 can further include a disk controller 150 coupled to the I/O channel 112. The disk controller 150 can include a disk interface 152 that can include other industry standard buses (e.g., Integrated Drive Electronics (IDE), Parallel Advanced Technology Attachment (PATA), Serial Advanced Technology Attachment (SATA), SCSI, or USB or proprietary buses, or any combination thereof. The disk controller 150 can be coupled to one or more disk drives via the disk interface 152. Such disk drives include a hard disk drive (HDD) 154 or an optical disk drive (ODD) 156 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 166 can read a removable data storage medium (e.g., a Compact Disk (CD), a Digital Video Disk (DVD), a mini Digital Video Disk (mini-DVD), or other optical media). Additionally, the information handling system 100 can include a disk emulator 160 that is coupled to the disk interface 152. The disk emulator 160 can permit a solid-state drive 164 to be coupled to the information handling system 100 via an external interface 162. The external interface 162 can include other industry standard busses (e.g., USB or IEEE 1394 (Firewire)) or proprietary busses, or any combination thereof. Alternatively, the solid-state drive 164 can be disposed within the information handling system 100.

The information handling system 100 can further include a management controller 170 that can be coupled to the chipset 110 via a system communication bus 172, such as a control bus. The management controller 170 may be on a main circuit board (e.g., a baseboard, a motherboard, or any combination thereof), integrated onto another component such as the chipset 110, in another suitable location, or any combination thereof. Although not illustrated, another resource, such as the processors 102 or 104, the memory 120, the graphics interface 130, the video display 134, the I/O interface 140, or the disk controller 150, or any combination thereof, can be coupled to the management controller 170. Commands, communications, or other signals may be sent to or received from the management controller 170 by any one or any combination of resources previously described. The management controller 170 can be part of an integrated circuit or a chip set within the information handling system 100.

The information handling system 100 can also include an I/O interface 180 that can be connected to the chipset 110 via the I/O channel 112. The I/O interface 180 can be coupled to a peripheral channel 182 that can be of the same industry standard or proprietary bus or link architecture as the I/O channel 112, or of a different industry standard or proprietary bus or link architecture than the I/O channel 112. As such, the I/O interface 180 can extend the I/O channel 112 capacity when the peripheral channel 182 is the same as the I/O channel 112, or translate information from a type suitable to the industry standard or proprietary bus or link architecture of the I/O channel 112 to a type suitable to a different industry standard or proprietary bus or link architecture, and vise versa, when the peripheral channel 182 is different than the I/O channel 182. Other I/O interfaces (not illustrated) may also be used in addition to the I/O interface 180, if needed or desired.

The peripheral channel 182 can include a bus structure that allows the installation and coupling of additional resources 184 through 186 to the information handling system. In accordance with an aspect (not illustrated), the peripheral channel 182 can also include one or more point-to-point links to the additional resources 184 through 186. The external resources 184 through 186 can include a data storage system, a graphics interface, another suitable resource or any combination thereof. The additional resources 184 through 186 can be on a main circuit board, on separate circuit boards or add-in cards disposed within the information handling system 100, devices that are external to the information handling system 100, or any combination thereof.

The information handling system 100 can also include a network interface device 190 that is coupled to the I/O interface 180 via the peripheral channel 182. The network interface device 190 may be a network interface card (NIC) disposed within the information handling system 100, on a main circuit board (e.g., a baseboard, a motherboard, or any combination thereof), integrated onto another component such as the chipset 110, in another suitable location, or any combination thereof. The network interface device 190 can include a network channel 192 and a network channel 194. The network interface device 190 can also include additional network channels (not illustrated). In accordance with an aspect, the network channels 192 and 194 are of a different industry standard or proprietary bus or link architecture than the peripheral channel 182, and the network interface device 190 can translate information from a type suitable to the industry standard or proprietary bus or link architecture of the peripheral channel 182 to a type suitable to the industry standard or proprietary bus or link architecture of the network channels 192 and 194, and vise versa. The network channels 192 and 194 can be of industry standard architecture (e.g., InfiniBand, Fibre Channel, Gb Ethernet, etc.), proprietary channel architecture, or any combination thereof. Other network interface devices (not illustrated) may also be used in addition to the network interface device 190, if needed or desired. The network channels 192 and 194 can be coupled to network resources (not illustrated). The network resource can include another information handling system, a data storage system, another network, a grid management system, another suitable resource or any combination thereof.

In an embodiment of the present disclosure, a storage service can be coupled to a network (e.g., the Internet), and can provide storage capacity to the user to store a copy of the user's content. The storage service can include a backup server, a data storage capacity, a data warehouse, an on-line service account storage capacity, a dedicated storage service provider, another type of storage capacity, or any combination thereof. The user can request the content provider to download a copy of the content to the storage service at substantially the same time that the user originally obtains the content. Subsequently, the user can obtain the user's content from the storage service. Because the storage service has received a duplicate copy of the content, downloaded directly from the content server, the user can download the content from the storage service, and the content will be packaged just as if it was downloaded from the content provider. Thus, the user is not burdened with understanding protection schemes in order to obtain copies of the user's content, or to share the user's content with other devices. Furthermore, because the user has all of the user's content in one place, the storage service, recreating the user's library may only involve accessing the user's content at the storage service. In order to limit access to the user's content, the storage service can provide the user with a way to securely access the user's content. A non-limiting example of a way to provide secure access to content is through a login and password access control, a physical attribute such as a fingerprint identification or another biometric identification, a secure device such as a smart card, a Java card, another access control scheme, or any combination thereof.

FIGS. 2 through 7 illustrate an embodiment of a network, shown generally as 200, and different embodiments of a method to permit a user to obtain, back up, and distribute protected content. The network 200 includes a network 210, a content server 220, a storage service 230, a user system 240, and a media system 250. The content server 220, the storage service 230, the user system 240, and the media system 250 are all coupled to the network 210 such that information can be communicated via the network 210. The storage service 230 includes a remote storage system 232. The remote storage system 232 functions to receive protected content from the network 210, store protected content, and send protected content to the network 210. After reading this disclosure, it will be appreciated that the remote storage system 232 can be a server, a data storage device, a distributed storage capacity, another suitable storage system, or any combination thereof. It will be further appreciated after reading this disclosure that the remote storage system 232 can be owned by, operated by, leased to, rented by, otherwise be made available to the storage service 230, or any combination thereof. In the description below, different transactions are designated by different ordinal numbers. The labeling of ordinals as used herein is merely for convenience, and is not intended to imply a required order of performance or priority.

Figure 2:
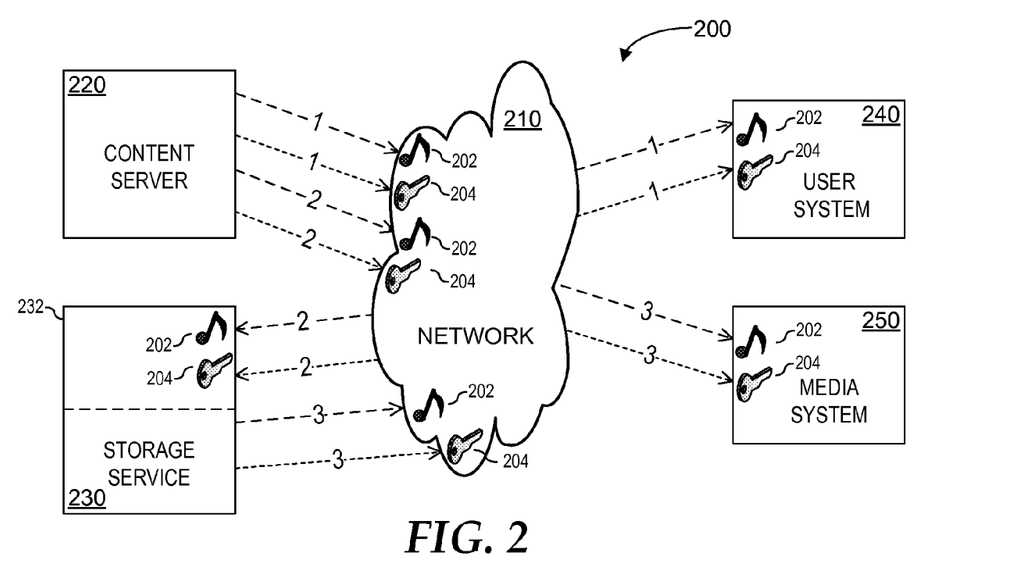
FIG. 2 illustrates an embodiment of a network including a transaction that permits a consumer to obtain, backup, and distribute protected content.

FIG. 2 illustrates a first transaction, wherein a content item 202 and a license 204 are sent from the content server 220 to the user system 240. As a result of this transaction, a user can display the content on the user system 240. In a second transaction, the content item 202 and the license 204 are sent from the content server 220 to the storage service 230. In this transaction, the user can request the content server 220 to send the content to the storage service 230 in order to back up the content. However, because the content item 202 and the license 204 are delivered from the content server 220, the storage service 230 can subsequently deliver the content just as if coming from the content server 220. For example, in a third transaction, the content item 202 and the license 204 are sent from the storage service 230 to the media system 250. Because the content item 202 and the license 204 are delivered in the same manner as if it were delivered from the content system 220, the user does not need to understand the protection scheme to distribute the content to the user's media system 250.

Figure 3:
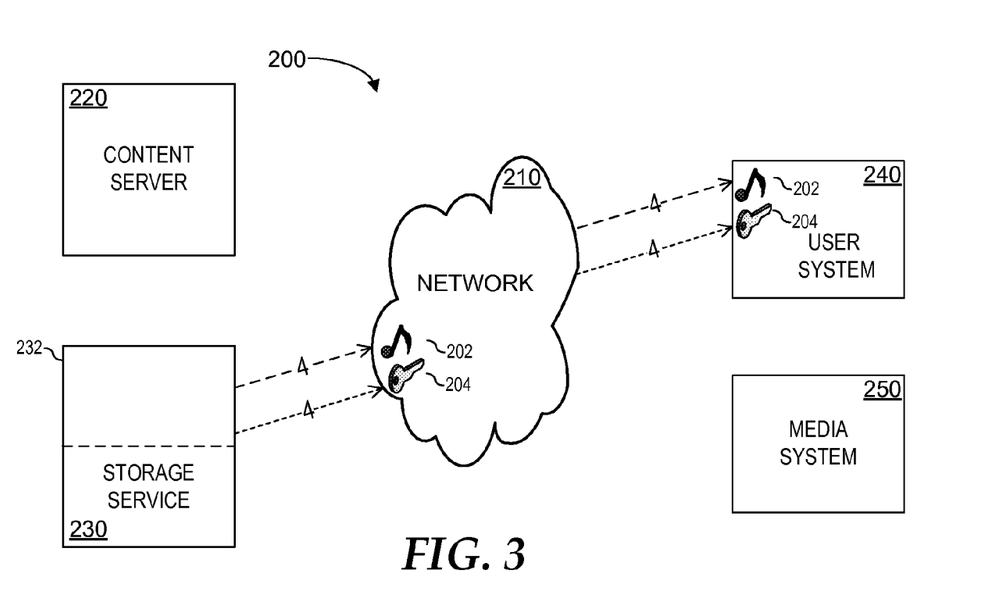
FIG. 3 illustrates an embodiment including a transaction where a content item and a license are sent from a content server to a consumer system.

FIG. 3 illustrates an embodiment 200 that includes a fourth transaction where the content item 202 and the license 204 are sent from the storage service 230 to the user system 240. In this transaction, the user can re-obtain the user's content directly from the storage service 230 in the event that the original protected content is lost, corrupted, inaccessible (e.g., as result of a failed storage device), or the like, on the user system 240. In another transaction (not illustrated), the content item 202 and the license 204 are sent from the storage service 230 to the media system 250. In this way, the media system 250 can be restored in a similar manner to the user system 240.

Figure 4:
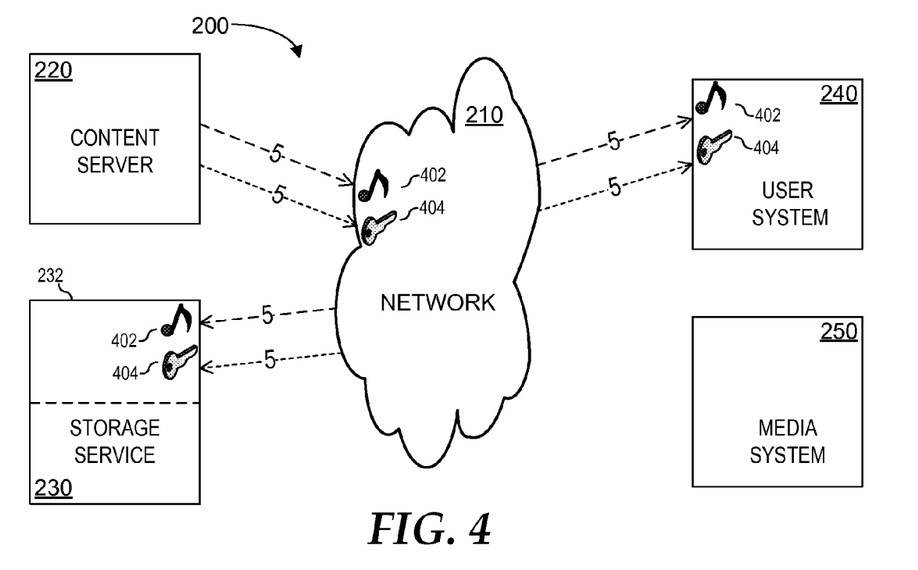
FIG. 4 illustrates an embodiment including a transaction where a content item and a license are sent from the content server to both the storage service and the consumer system.

FIG. 4 illustrates an embodiment 200 that includes a fifth transaction where a content item 402 and a license 404 are received from the content server 220 by both the storage service 230 and the user system 240. The user can request that, when content is sent from the content provider 220, it is substantially simultaneously received by the storage network 230 and the user system 240. Other transactions (not illustrated) can follow the fifth transaction, such that the content item 402 and the license 404 are sent to the media system 250, resent to the user system 240, resent to the media system 250, or any combination thereof.

Figure 5:
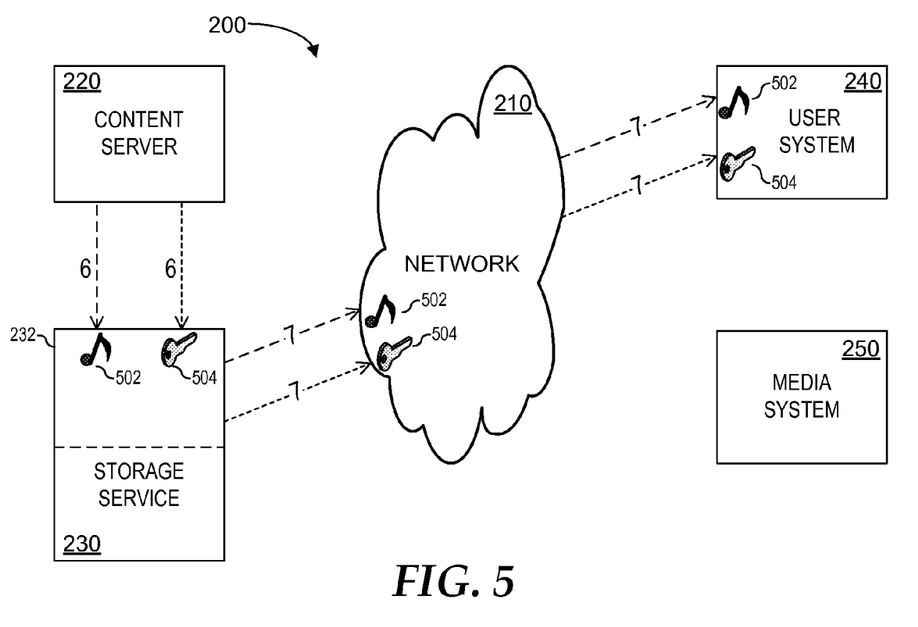
FIG. 5 illustrates an embodiment including a transaction where a content item and a license are sent from the content server directly to the storage service.
Figure 6:
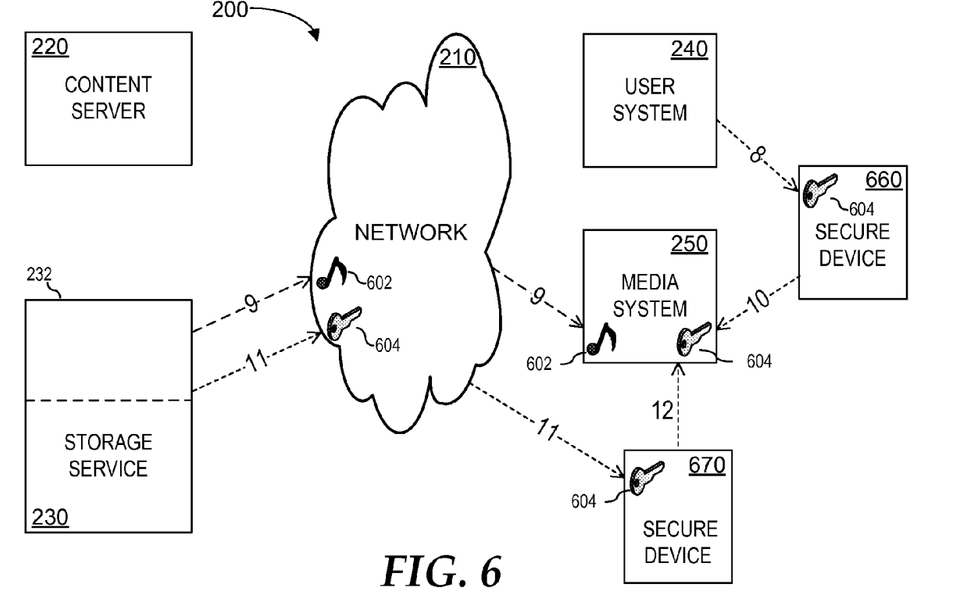
FIG. 6 illustrates an embodiment where secure devices enable the consumer to share content with a media system.

FIG. 5 illustrates an embodiment 200 that includes a sixth transaction where a content item 502 and a license 504 are sent from the content server 220 to the storage service 230 without passing through the network 210. Subsequently, in a seventh transaction, the content item 502 and the license 504 are sent by the storage service 230 to the user system 240. The content server 220 and the storage service 230 can be coupled to another network (not illustrated) to facilitate content transfers. As an example, the content provider 220 and the storage service 240 may be owned and operated by the same entity. Other transactions (not illustrated) can follow the seventh transaction, such that the content item 502 and the license 502 are resent to the user system 240, resent to the media system 250, or any combination thereof FIG. 6 illustrates the use of secure devices 660 and 670 on the network 200 to enable a user system 240 to share content with a media system. Here, a content item 602 and a license 604 are resident on the storage service 230 and on the user system 240. In an eighth transaction, the license 604 is received from the user system 240 to the secure device 660. Sending the secure item 604 to the secure device 660 can be in conjunction with sending the content item 602 and the license 604 to the user system 240 (e.g., by any of the methods described above), or as a separate activity. The secure device 660 can be easily carried from one location to another by the user. The secure device 660 can include a smart card, a Java card, another secure device, or any combination thereof. Where the secure device 660 includes a web interface capability, the user can couple the secure device 660 to the media system 250 and access the storage service 230. In a ninth transaction, the user can request the storage service 230 to send the content item 602 to the media system 250, and in a tenth transaction, provide the license 604 to the media system 250 from the secure device 660. In this way, the user can access the content item 602 from any device (e.g., the media device 250) that is coupled to the network 210, and, by carrying the license 604 on the secure device 660, display the content on another system, as desired by the user. In an eleventh transaction, the user can request the storage service 230 to send the license 604 to another secure device 670, where, in a twelfth transaction, the secure device 670 sends the license 604 to the media system 250 in order to display the content. In this way, if the user loses the secure device 660, or loses data on the secure device 660, the user can replace the lost license 604 from the storage service 230.

Figure 7:
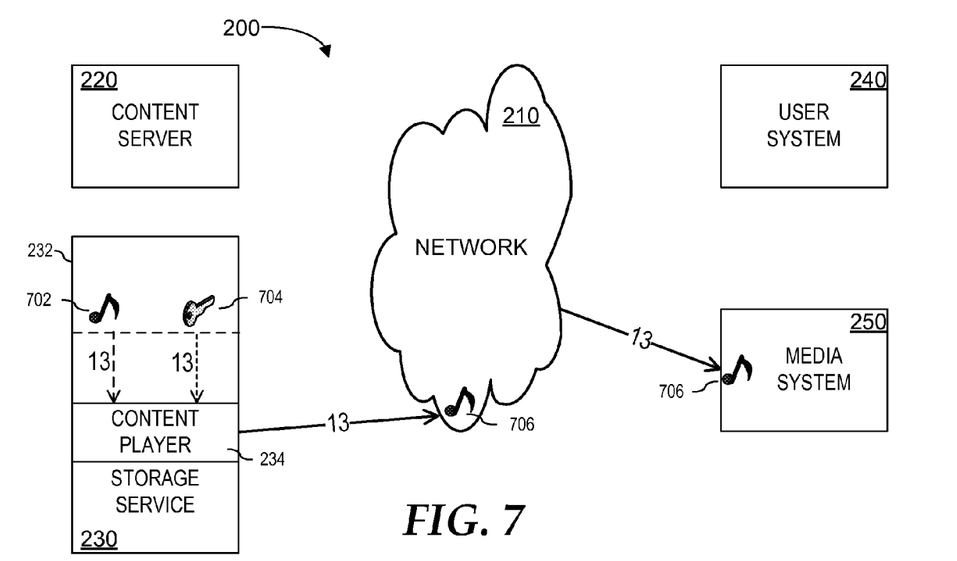
FIG. 7 illustrates an embodiment including a transaction where the storage service includes a content player that receives a content item and a license from the storage service.

FIG. 7 illustrates an embodiment 200 that includes a thirteenth transaction where the storage service 230 includes a content player 234 that receives a content item 702 and a license 704 from the storage service 230. In a fourteenth transaction, the content player 234 sends a content stream 706 to the media system 250. In this way, the user can display the content on the media system 250, and the media system 250 does not need to store the content item 702.

Figure 8:
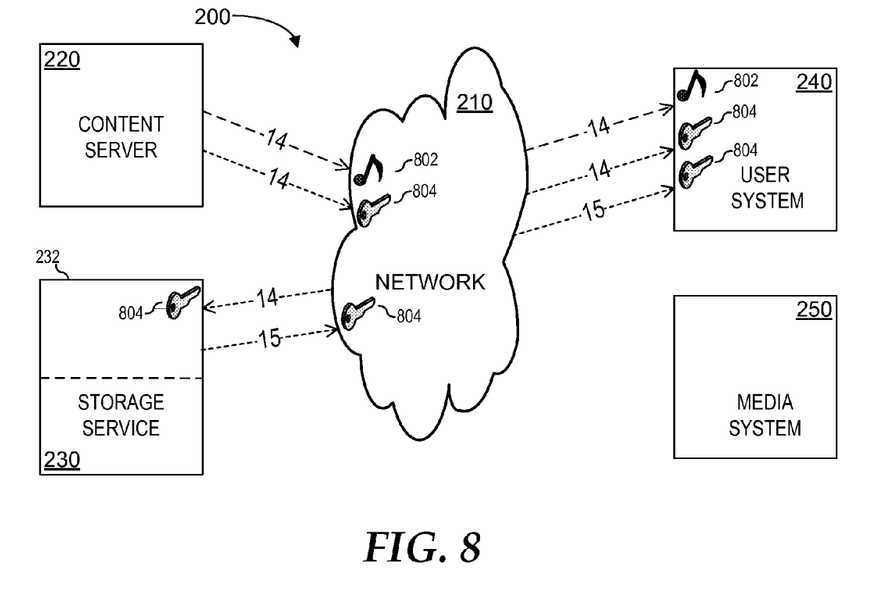
FIG. 8 illustrates an embodiment including a fourteenth transaction where a content item and a license are received from the content server by the user system, but only the license is received by the storage service.

FIG. 8 illustrates an embodiment 200 that includes a fourteenth transaction where a content item 802 and a license 804 are received from the content server 220 by the user system 240, but only the license 804 is received by the storage service 230. The user can request that, when content is sent from the content provider 220, the license 804 is substantially simultaneously received by the storage network 230 and the user system 240. In a fifteenth transaction, the storage service sends the license 804 to the user system 240. In this way, the user can replace a lost license 804 from the storage service 230. Other transactions (not illustrated) can follow the fifteenth transaction, such that the license 804 is sent to the media system 250, resent to the user system 240, resent to the media system 250, or any combination thereof Many different aspects and embodiments of the present disclosure are possible. Some of those aspects and embodiments are described below. After reading this specification, skilled artisans will appreciate that those aspects and embodiments are only illustrative, and do not limit the scope of the present invention.

In a first aspect, a method includes receiving at a remote storage system coupled to a network a content item from a content provider and a license to the content item from the content provider, where the content item cannot be displayed on a user system without the license to the content item, receiving at the remote storage system a first request from a first particular user system coupled to the network to send the content item and the license to the content item to the first particular user system, wherein the first particular user system is coupled to the network separately from the remote storage system, and sending the content item and the license to the content item from the remote storage system to the first particular user system in response to the first request.

In an embodiment of the first aspect, the method further includes receiving at the remote storage system a second request from the first particular user system to send the content item to a second particular user system coupled to the network, and sending the content item from the remote storage system to the second particular user system in response to the second request. In a further embodiment, the method includes receiving at the remote storage system a third request from the first particular user system to send the license to the content item to the second particular user system, and sending the license to the content item from the remote storage system to the second particular user system in response to the third request. In another embodiment, the second request and the third request comprise a same request. In yet another embodiment, the method includes receiving at the remote storage system a third request from the first particular user system to send the license to the content item to a secure device coupled to the network, and sending the license to the content item from the remote storage system to the secure device in response to the third request. In still another embodiment, the method includes receiving at the remote storage system a third request from a secure device coupled to the first particular user system to send the content item to a second particular user system coupled to the network, and sending the content item from the remote storage system to the second particular user system in response to the third request. In another embodiment, sending the content item to the second particular user system comprises streaming the content item to the second particular user system from the remote storage system.

In another embodiment of the first aspect, sending the content item and the license to the content item to the first particular user system and receiving the content item and the license to the content item from the content provider occurs substantially simultaneously. In still another embodiment of the first aspect, receiving the content item and the license to the content item from the content provider occurs over the network. In yet another embodiment of the first aspect, receiving the content item and the license to the content item from the content provider occurs directly from the content provider.

In a second aspect, a method includes requesting at a first user system coupled to a network to receive from a content provider a content item and a license to the content item, receiving at the first user system the content item and the license to the content item in response to the request to the content provider, requesting from the first user system that the content provider send to a remote storage system coupled to the network the content item and the license to the content item, where the remote storage system is coupled to the network separately from the first user system, and requesting from the first user system that the remote storage system send the content item to a second user system coupled to the network.

In an embodiment of the second aspect, the method further includes requesting from the first user system that the remote storage system send the license to the content item to the second user system. In another embodiment, the method includes sending from the first user system the license to the content item to a secure device. In still another embodiment, the method includes requesting from the first user system that the remote storage system send the license to the content item to a secure device. In yet another embodiment of the second aspect, the method includes requesting at the first user system coupled to a network to receive the content item and the license to the content item from the remote storage system, and receiving at the first user system the content item and the license to the content item in response to the request to the remote storage system.

In a third aspect, machine-executable code for an information handling system comprising a first resource, wherein the machine-executable code is embedded within a tangible medium includes instructions for carrying out a method including requesting at a first user system to receive a content item and a license to the content item from a content provider, storing at the first user system the content item and the license to the content item in response to the request to the content provider, requesting from the first user system that the content provider send to a remote storage system coupled to the network the content item and the license to the content item, wherein the remote storage system is coupled to the network separately from the first user system, and requesting from the first user system that the remote storage system send the content item to a second user system coupled to the network.

In an embodiment of the third aspect, the method further includes requesting from the first user system that the remote storage system send the license to the content item to the second user system. In another embodiment, the method includes sending from the first user system the license to the content item to a secure device. In still another embodiment, the method includes requesting from the first user system that the remote storage system send the license to the content item to a secure device. In yet another embodiment, the method further includes requesting at the first user system to receive the content item and the license to the content item from the remote storage system, and storing at the first user system the content item and the license to the content item in response to the request to the remote storage system.

Note that not all of the activities described above in the general description or the examples are required, that a portion of a specific activity may not be required, and that one or more further activities may be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features described herein in the context of separate embodiments for the sake of clarity, may also be provided in combination in a single embodiment. Conversely, various features that are, for brevity, described in the context of a single embodiment, may also be provided separately, or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving at a remote storage system coupled to a network:
      a content item from a content provider; and
      a license to the content item from the content provider, wherein the content item cannot be displayed on a user system without the license to the content item;
   receiving at the remote storage system a first request from a first particular user system coupled to the network to send the content item and the license to the content item to the first particular user system, wherein the first particular user system is coupled to the network separately from the remote storage system;
   in response to the first request, sending the content item and the license to the content item from the remote storage system to the first particular user system;
   receiving at the remote storage system a second request from the first particular user system on behalf of a second particular user system coupled to the network to send the content item to the second particular user system, wherein the first request and the second request are different requests; and
   in response to the second request, sending the content item from the remote storage system directly to the second particular user system, wherein the content item is not sent from the first user system.

2. The method of claim 1, further comprising:
   receiving at the remote storage system a third request from the first particular user system to send the license to the content item to the second particular user system; and
   in response to the third request, sending the license to the content item from the remote storage system to the second particular user system.

3. The method of claim 2, wherein the second request and the third request comprise a same request.

4. The method of claim 1, further comprising:
   receiving at the remote storage system a third request from the first particular user system to send the license to the content item to a secure device coupled to the network; and
   in response to the third request, sending the license to the content item from the remote storage system to the secure device.

5. The method of claim 4, wherein the secure device comprises a smart card.

6. The method of claim 1, further comprising:
   receiving at the remote storage system a third request from a secure device coupled to the second particular user system to send the content item to a second particular user system coupled to the network; and
   in response to the third request, sending the content item from the remote storage system to the second particular user system.

7. The method of claim 1, wherein sending the content item to the second particular user system comprises streaming the content item to the second particular user system from the remote storage system.

8. The method of claim 1, wherein sending the content item and the license to the content item to the first particular user system and receiving the content item and the license to the content item from the content provider occurs substantially simultaneously.

9. The method of claim 1, wherein receiving the content item and the license to the content item from the content provider occurs over the network.

10. The method of claim 1, wherein receiving the content item and the license to the content item from the content provider occurs directly from the content provider.

11. A method comprising:
providing a first request at a first user system coupled to a network to receive from a content provider:
a content item; and
a license to the content item;
in response to the first request to the content provider, receiving at the first user system:
the content item; and
the license to the content item;
providing a second request from the first user system that the content provider send to a remote storage system coupled to the network, wherein the remote storage system is coupled to the network separately from the first user system:
the content item; and
the license to the content item;
providing a third request from the first user system on behalf of a second user system coupled to the network that the remote storage system send the content item to the second user system;
providing a fourth request from the first user system on behalf of a first secure device coupled to the network that the remote storage system send the license to the content item to the first secure device; and
in response to the fourth request, providing from the first secure device the license to the content item directly to the second user system, wherein the license to the content item is not sent from the first user system;
wherein the first, second, third, and the fourth requests are different requests.

12. The method of claim 11, further comprising providing a fifth request from the first user system that the remote storage system send the license to the content item to the second user system.

13. The method of claim 11, further comprising, in response to the fifth request, sending from the first user system the license to the content item directly to a second secure device, wherein the license to the content item is not sent from the first user system.

14. The method of claim 11, further comprising:
providing a fifth request at the first user system coupled to a network to receive from the remote storage system:
the content item; and
the license to the content item; and
in response to providing the fifth request to the remote storage system, receiving at the first user system:
the content item; and
the license to the content item.

15. The method of claim 11, wherein the first secure device comprises a smart card.

16. Machine-executable code for an information handling system comprising a first resource, wherein the machine-executable code is embedded within a non-transitory medium and includes instructions for carrying out a method comprising:
providing a first request at a first user system to receive from a content provider:
a content item; and
a license to the content item;
in response to providing the first request to the content provider, storing at the first user system:
the content item; and
the license to the content item;
providing a second request from the first user system that the content provider send to a remote storage system coupled to the network, wherein the remote storage system is coupled to the network separately from the first user system:
the content item; and
the license to the content item;
providing a third request from the first user system on behalf of a second user system coupled to the network that the remote storage system send the content item to the second user system;
providing a fourth request from the first user system on behalf of a first secure device coupled to the network that the remote storage system send the license to the content item to the first secure device; and
in response to the fourth request, providing from the first secure device the license to the content item directly to the second user system, wherein the license to the content item is not sent from the first user system;
wherein the first, second, third, and the fourth requests are different requests.

17. The machine-executable code of claim 16, wherein the method further comprises providing a fifth request from the first user system that the remote storage system send the license to the content item to the second user system.

18. The machine-executable code of claim 16, further comprising sending from the first user system the license to the content item to a second secure device.

19. The machine-executable code of claim 16, wherein the method further comprises:
providing a fifth request at the first user system to receive from the remote storage system:
the content item; and
the license to the content item; and
in response to providing the fifth request to the remote storage system, storing at the first user system:
the content item; and
the license to the content item.

20. The machine-executable code of claim 16, wherein the first secure device comprises a smart card.

* * * * *